United States Patent

[11] 3,625,997

[72] Inventors: Georg Anner, Basel; Hellmut Ueberwasser, Riehen; Peter Wieland, Oberwil, Basel-Land, all of Switzerland
[21] Appl. No. 725,182
[22] Filed Apr. 29, 1968
[45] Patented Dec. 7, 1971
[73] Assignee Ciba Corporation, New York, N.Y.
[32] Priorities May 3, 1967
[33] Switzerland
[31] 6440/67;
May 3, 1967, Switzerland, No. 6441/67

[54] 3-OXO-A-NOR-B-HOMO-PREGNADIENES AND A PROCESS FOR THEIR MANUFACTURE
14 Claims, No Drawings

[52] U.S. Cl.................................. 260/488, 260/340.9, 260/348, 260/586, 424/278, 424/311, 424/331
[51] Int. Cl.................................. C07c 69/02
[50] Field of Search.................... 260/348 C, 488 B, 586 H

[56] References Cited
UNITED STATES PATENTS
3,184,504  5/1965  Muller et al. ............... 260/586
3,338,969  8/1967  Muller et al. ............... 260/586

Primary Examiner—Alex Mazel
Assistant Examiner—James H. Turnipseed
Attorneys—Harry Goldsmith, Joseph G. Kolodny, Bryant W. Brennan and Edward J. Sites ABSTRACT: Compounds of the formula

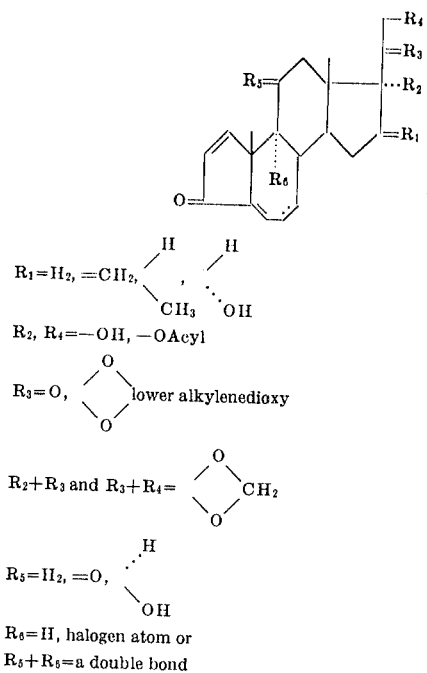

$R_1 = H_2, =CH_2,$ $\begin{array}{c}H\\ \diagup\\ CH_3\end{array}$, $\begin{array}{c}H\\ \diagup\\ OH\end{array}$ $R_2, R_4 = -OH, -OAcyl$ $R_3 = O,\ \begin{array}{c}O\\ \diagup\ \diagdown\\ O\end{array}$ lower alkylenedioxy $R_2 + R_3$ and $R_3 + R_4 = \begin{array}{c}O\\ \diagup\ \diagdown\\ O\end{array} CH_2$ $R_5 = H_2, =O, \begin{array}{c}H\\ \diagup\\ OH\end{array}$ $R_6 = H$, halogen atom or
$R_5 + R_6 = $ a double bond for example: 3,20-dioxo-11β,17-dihydroxy-21-acetoxy-A-nor-B-homo-pregna-1,5-diene or 3,11,20-trioxo-17-hydroxy-21-acetoxy-A-nor-B-homo-pregna-1,5,7-triene.
Use: anti-inflammatory agents.

3-OXO-A-NOR-B-HOMO-PREGNADIENES AND A PROCESS FOR THEIR MANUFACTURE

The present invention provides new -oxo-A-nor-B-homo-pregnadienes of the general formula

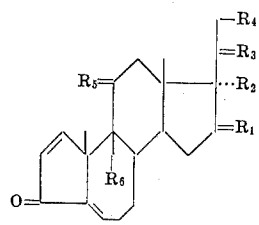

which may contain a further double bond in 7,7α-position, where $R_1$ represents two hydrogen atoms, a methylene group, or a hydrogen atom together with an α-positioned free or etherified hydroxyl group or with an α- or β-positioned methyl group; $R_2$ and $R_4$ each is a hydrogen atom or a free, esterified or etherified hydroxyl group; $R_3$ represents an oxo group or a lower alkylenedioxy group, or $R_2+R_3$ and $R_3+R_4$ together stand for a methylenedioxy group each; $R_5$ represents two hydrogen atoms, an oxo group or a hydrogen atom together with a β-positioned hydroxyl group; $R_6$ represents a hydrogen or halogen atom or $R_5+R_6$ stand for a double bond or an epoxide group, and a process for their manufacture.

The new compounds possess valuable pharmacological properties, inter alia they have an inhibiting effect on the connective tissue granuloma, as can be shown in animal tests, for example on the rat. The new compounds may therefore be used as anti-inflammatory medicaments. They are, however, also valuable intermediates for the manufacture of other useful substances, especially pharmacologically active compounds.

Special mention deserve those compounds of the above formula in which $R_1$ represents two hydrogen atoms and $R_6$ one hydrogen atom and the residues $R_2$ to $R_5$ have the above meanings, especially 3,20-dioxo-11β,17,21-trihydroxy-A-nor-B-homopregna-1,5-diene or its 21-esters with a lower alkanoic acid, especially its 21-acetate and 3,11,20-trioxo-17,21-dihydroxy-A-nor-B-homopregna-1,5,7-triene or its 21-esters with a lower alkanoic acid, especially its 21-acetate which, for example in the rat, display a pronounced granuloma inhibiting effect on subcutaneous or oral administration of doses of 1 to 10 mg. per kg. of bodyweight.

The new compounds are obtained when a compound of the formula

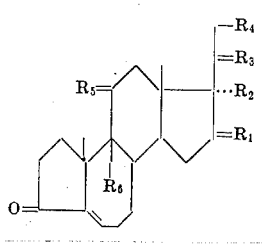

where $R_1$ to $R_6$ have the above meanings is dehydrogenated in the 1,2-position, and, if desired, a compound obtained is treated with an N-halogen-acylamide or acylimide and the reaction product is dehydrohalogenated.

The dehydrogenation is carried out in the usual manner, especially by treating the said compounds with a quinone, such as chloranil, especially 2,3-dichloro-5,6-dicyanobenzoquinone, or selenous acid or a derivative thereof, such as selenium dioxide or dibenzoyloxy-selenium oxide. This dehydration may be carried out in a solvent, advantageously in an ether or alcohol, such as diethyl ether, dioxane, tetrahydrofuran, ethanol or tertiary butanol, and advantageously at an elevated temperature.

The new compounds are also obtained when a compound of the general formula

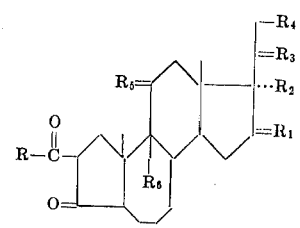

where the residues $R_1$ to $R_6$ have the above meanings and R stands for hydrogen or a free or esterified carboxyl group is reacted with a halogen or a halogen donor and the reaction product is dehydrohalogenated and, if desired, a compound obtained is treated with an N-halogen-acylamide or acylimide and the reaction product is dehydrohalogenated.

The halogen to be used in the present process is advantageously chlorine or bromine, though the other stable halogens are suitable as well. Suitable halogen donors are, inter alia, inorganic or organic halogen donors, such as pyridinium hydrochloride-perchloride, pyridinium hydrobromide-perbromide or dioxane dibromide.

The reaction with the said compounds is advantageously performed in an inert organic solvent, especially in a halogenated hydrocarbon such as carbon tetrachloride or fluorotrichloromethane, in an ether such as diethyl ether, tetrahydrofuran or glycol diethyl ether, a dialkyl-formamide or sulfoxide such as dimethyl-formamide or sulfoxide, or in a tertiary alcohol such as tertiary butanol, or in a carboxylic acid such as acetic acid, advantageously at a low temperature, in the presence or absence of a catalyst, such as a basic agent, for example an alkali metal acylate such as potassium acetate and/or in an inert gas.

The halogen compounds obtained in this manner are then dehydrohalogenated in known manner, advantageously with the use of inorganic or organic bases, for example alkali or alkaline earth metal hydroxides, carbonates or bicarbonates, such as sodium or potassium hydroxide, carbonate or bicarbonate, or nitrogen bases such as pyridine, collidine or a dialkylformamide. The latter, for example dimethylformamide, is advantageously applied in the presence of a lithium salt, for example a lithium halide, such as lithium chloride or bromide, if desired with addition of lithium carbonate. The dehydrohalogenation is carried out in the presence or absence of a suitable solvent or diluent reaction accelerator, at room temperature or with cooling or heating, under atmospheric or superatmospheric pressure and/or under an inert gas. Under the reaction conditions described above the R—CO— residue in position 2 of the skeleton is eliminated at the same time.

According to another way of manufacturing the new compounds a 3-enolester or 3-enolether of the formula

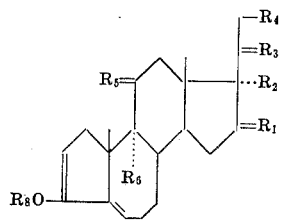

where $R_8$ represents a lower aliphatic or aromatic residue or an aliphatic carboxylic acid residue, and $R_1$ to $R_6$ have the above meanings, is reacted with an N-halogenacylamide or N-halogenacylimide, such as N-bromo-acetamide or especially N-bromosuccinimide, and the resulting halogen derivative is dehydrohalogenated, and, if desired, a compound obtained is treated with an N-halogen-acylamide or acylimide and the reaction product is dehydrohalogenated.

The reaction of this invention is advantageously performed in an inert organic solvent, especially in a halogenated hydrocarbon such as carbon tetrachloride or fluorotrichloromethane, in an ether such as diethyl ether, tetrahydrofuran or glycol diethyl ether, or in a dialkyl-formamide or sulphoxide such as dimethyl-formamide or dimethyl-sulphoxide, or in a tertiary alcohol, such as tertiary butanol, or in a carboxylic acid such as acetic acid, advantageously at a low temperature, in the presence or absence of a catalyst and/or in an inert gas.

In the $\Delta^{1,5}$-dienes obtained a further double bond may, if desired, be introduced by reacting the said compounds with an N-halogenacylamide or N-halogenacylimide, such as N-bromoacetamide or especially N-bromosuccinimide, and dehydrohalogenating the reaction product.

The reaction with the said dienes is advantageously performed in an inert organic solvent, especially in a halogenated hydrocarbon such as carbon tetrachloride or fluorotrichloromethane, in an ether such as diethyl ether, tetrahydrofuran or glycol diethyl ether, in a dialkyl-formamide or sulphoxide such as dimethylformamide or dimethylsulfoxide, or in a tertiary alcohol such as tertiary butanol, or in a carboxylic acid such as acetic acid, advantageously with cooling, in the presence or absence of a catalyst and/or in an inert gas.

The halogen compounds obtained in this manner are then dehydrohalogenated by known methods, advantageously with the use of an inorganic or organic base, for example an alkali or alkaline earth metal hydroxide, carbonate or bicarbonate, such as sodium or potassium hydroxide, carbonate or bicarbonate, or a nitrogen base such as pyridine, collidine or a dialkylformamide. The latter, for example dimethylformamide, is used with advantage in the presence of lithium salts, for example a lithium halide such as lithium chloride or lithium bromide, if desired, with addition of lithium carbonate. The dehydrohalogenation is carried out in the presence or absence of a suitable solvent or diluent or reaction accelerator, at room temperature or with cooling or heating, under atmospheric or superatmospheric pressure, and/or in an inert gas.

If desired, groups present in the resulting process products may be modified, exchanged or eliminated by known methods, or new groups may be introduced into them in known manner. Thus, possibly present esterified or etherified hydroxyl groups or ketalized oxo groups may be hydrolytically split. It is, however, also possible to convert an 11$\beta$-hydroxyl group present into a 9,11-double bond and the latter, if desired, may be epoxidized. Protective groups, especially 16,17-acetonides or 17,20;20,21-bismethylenedioxy groups can be eliminated in the usual manner, for example with acids. The bismethylenedioxy group can be split with advantage with the use of hydrogen fluoride, especially in the presence of urea or an acylamide.

The starting materials to be used in the present process are known or are accessible by known methods, for example by reduction of the known 3,6-dioxo-A-nor-B-homopregnanes, for example by means of a light metal hydride and subsequent dehydrogenation of the 3-oxo-6-hydroxy compound formed.

The invention includes also any variant of the process in which a compound obtained as intermediate at any stage of the process is used as starting material and any remaining steps are carried out or a starting material is formed in situ or is used in the form of a salt or other derivative thereof.

The new compounds may be used, for example, in the form of pharmaceuticals containing them in the free form or in the form of their salts in admixture or conjunction with an organic or inorganic, solid or liquid pharmaceutical excipient suitable for enteral, parenteral or local administration. Suitable excipients are substances that do not react with the new compounds, such as water, gelatin, lactose, starches, stearyl alcohol, magnesium stearate, talcum, vegetable oils, benzyl alcohols, gums, propylenegycols, white petroleum jelly, cholesterol or other known medicinal excipients. The pharmaceutical preparations may be, for example, tablets, dragees, capsules, ointments or creams, or in liquid form solutions, suspensions or emulsions. If desired, they may be sterilized and/or contain assistants such as preserving, stabilizing, wetting or emulsifying agents, solution promoters, salts for regulating the osmotic pressure or buffers. They may also contain other therapeutically valuable substances. The pharmaceutical preparations are formulated by the usual methods.

The new compounds may also be used in veterinary medicine, for example in one of the above-mentioned forms, or in the form of feedstuffs or additives to feedstuffs, using, for example, the usual extenders and diluents or feedstuffs respectively.

The following examples illustrate the invention without in any way restricting it thereto.

EXAMPLE 1

A solution of 4 g. of the 17,20;20,21-bismethylenedioxy derivative of 3,20-dioxo-11$\beta$,17$\alpha$,21-trihydroxy-A-nor-B-homo-$\Delta^5$-pregnene in 800 ml. of absolute dioxane is mixed with 8 g. of dichlorodicyano-benzoquinone and the whole is boiled for 64 hours under nitrogen, then cooled, suction-filtered, rinsed with toluene and evaporated under vacuum. The residue is chromatographed on 120 g. of alumina (activity II). The fractions eluted with a 97:3-mixture of toluene and ethyl acetate yield on crystallization from methylenechloride+ether 1.6 g. of the 17,20;20,21-bismethylenedioxy derivative of 3,20-dioxo-11$\beta$,17$\alpha$,21-trihydroxy-A-nor-B-homo-$\Delta^{1,5}$-pregnadiene melting at about 290° to 300° C.

EXAMPLE 2

A mixture of 1 g. of the 17,20;20,21-bismethylenedioxy derivative of 3,20-dioxo-11$\beta$,17$\alpha$,21-trihydroxy-A-nor-B-homo-$\Delta^{1,5}$-pregnadiene and 200 ml. of acetone is mixed with 1.2 ml. of 8N-chromic acid solution while being stirred at 0° C. Thirty minutes later water is added and the whole extracted with methylenechloride. The organic solutions are washed with dilute sodium bicarbonate solution and water, dried and evaporated under vacuum. Crystallization of the residue from a mixture of methylenechloride and ether furnishes 910 mg. of the 17,20;20,21-bismethylenedioxy derivative of 3,11,20-trioxo-17$\alpha$,21-dihydroxy-A-nor-B-homo-$\Delta^{1,5}$-pregnadiene.

This compound is also obtained when the 17,20;20,21-bismethylenedioxy derivative of 3,11,20-trioxo-17$\alpha$,21-dihydroxy-A-nor-B-homo-$\Delta^5$-pregnene is dehydrated with dichlorodicyano-benzoquinone as described in example 1.

EXAMPLE 3

A mixture of 580 mg. of the 17,20;20,21-bismethylenedioxy derivative of 3,11,20-trioxo-17$\alpha$,21-dihydroxy-A-nor-B-homo-$\Delta^{1,5}$-pregnadiene and 6 ml. of a solution of hydrogen fluoride in urea (ratio about 1.3:1) is stirred for 30 minutes at 0° C. The batch is then poured into a solution of 48 g. of sodium acetate in 180 ml. of water and extracted with ethyl acetate. The batch is washed with saturated sodium bicarbonate solution and with water, dried and evaporated under vacuum, and the crude 3,11,20-trioxo-17$\alpha$,21-dihydroxy-A-nor-B-homo-$\Delta^{1,5}$-pregnadiene is acetylated with pyridine and acetic anhydride. The resulting 21-0-acetate is chromatographed on 30 g. of silicagel containing 15 percent of water and recrystallized from methylenechloride+ether, to yield 380 mg. of 3,11,20-trioxo-17$\alpha$-hydroxy-21-acetoxy-A-nor-B-homo-$\Delta^{1,5}$-pregnadiene melting at 230° to 234° C.

EXAMPLE 4

As described in example 3, 800 mg. of the 17,20;20,21-bismethylenedioxy derivative of 3,20-dioxo-11$\beta$,17$\alpha$,21-trihydroxy-A-nor-B-homo-$\Delta^{1,5}$-pregnadiene are converted with 8 ml. of a solution of hydrogen fluoride in urea into 3,20-dioxo-11$\beta$,17$\alpha$,21-trihydroxy-A-nor-B-homo-$\Delta^{1,5}$-pregnadiene, whose 21-0-acetate melts at 214° to 216° C. after recrystallization from methylenechloride+ether.

EXAMPLE 5

While stirring and cooling with ice a mixture of 1.2 g. of the 17,20;20,21-bismethylenedioxy derivative of 3,20-dioxo-11$\beta$,17$\alpha$,21-trihydroxy-A-nor-B-homo-$\Delta^{1,5}$-pregnadiene and 26 ml. of pyridine it is mixed with a solution of 730 mg. of N-bromo-succinimide in 11.4 ml. of pyridine, and for 10 minutes at −10° C. sulfur dioxide is introduced. The batch is then poured into ice water and extracted with methylenechloride. The organic solutions are washed with water, dried and evaporated under vacuum and the residue is chromatographed on 36 g. of alumina (activity II). Toluene elutes the 17,20;20,21-bismethylenedioxy derivative of 3,20-dioxo-17α,21-dihydroxynA-nor-B-homo-$\Delta^{1,5,9(11)}$-pregnatriene. Yield: 710 mg. after recrystallization from a mixture of methylenechloride, ether and petroleum ether; melting point: 209°–210.5° C.

When the fractions eluted with a 9:1-mixture of toluene and ethyl acetate are crystallized from methylenechloride+ether, 240 mg. of starting material are recovered.

EXAMPLE 6

While stirring and cooling with ice under nitrogen a solution of 690 mg. of the 17,20;20,21-bismethylenedioxy derivative of 3,20-dioxo-17α,21-dihydroxy-A-nor-B-homo-$\Delta^{1,5,9(11)}$-pregnatriene in 50 ml. of tetrahydrofuran, 150 ml. of 2.66N-perchloric acid are dropped in within 25 minutes. The whole is stirred for 22 hours at room temperature, then poured into saturated sodium chloride solution and extracted with methylenechloride. The extract is washed with sodium bicarbonate solution and sodium chloride solution, dried and evaporated under vacuum and the resulting crystalline 3,20-dioxo-17α,21-dihydroxy-A-nor-B-homo-$\Delta^{1,5,9(11)}$-pregnatriene is converted with pyridine and acetic anhydride into its 21-O-acetate which, after chromatography on 36 g. of silicagel containing 15 percent of water and recrystallization from methylenechloride+ether, melts at 217.5°–219° C.

EXAMPLE 7

A stirred mixture of a solution of 21.43 g. of the 17,20;20,21-bismethylenedioxy derivative of 3,11,20-trioxo-17α,21-dihydroxy-A-nor-B-homo-pregnane described herein after in 700 ml. of glacial acetic acid and 10 ml. of a 10 percent solution of hydrogen bromide in glacial acetic acid is mixed within 32 minutes with 220 ml. of an 0.494N-solution of bromine in glacial acetic acid, containing 4.35 g. of sodium acetate. Ten minutes later, the whole is poured into 2 liters of water, extracted with methylenechloride, washed with 2N-sodium carbonate solution and with water, dried and evaporated under vacuum at a bath temperature of 40° C. The residue is stirred for 10 hours under nitrogen at a bath temperature of 100° C. with a mixture of 1.2 liters of dimethylformamide, 45 g. of lithium carbonate and 45 g. of lithium bromide. The batch is then poured into 4 liter of water and 90 ml. of glacial acetic acid, extracted with methylenechloride, washed with water, dried and evaporated under vacuum. To remove the remaining dimethylformamide the product is dissolved in xylene and once more evaporated under vacuum. The residue is chromatographed on 1 kg. of silicagel. The fractions eluted with a 9:1 mixture of toluene and ethyl acetate are recrystallized from methylenechloride+ether+petroleum ether, to furnish 14.18 g. of a mixed crystallizate which is mixed with 500 ml. of methanol, then with a solution of 20 g. of sodium pyrosulphite in 100 ml. of water and the whole is boiled for 10 hours under nitrogen while being stirred. The cooled solution is poured into 600 ml. of water, the whole is extracted with 4×350 ml. of methylenechloride and the organic solutions are washed with 3×250 ml. of sodium chloride solution of 5 percent strength. The organic solutions are dried and evaporated and furnish 6.55 g. of a crystalline residue which consists predominantly of starting material.

The aqueous solutions obtained above are combined and mixed with 300 ml. of 10 percent sodium hydroxide solution, whereupon immediately a milky turbidity appears. The whole is extracted three times with methylenechloride and once with ether, and the organic solutions are repeatedly washed with water, dried and evaporated under vacuum. The residue is recrystallized from methylenechloride+ether, to yield 6.74 g. of a crystallizate consisting of an about 2:1 mixture of the 17,20;20,21-bismethylenedioxy derivatives of 3,11,20-trioxo-17α,β1-dihydroxy-A-nor-B-homo-$\Delta^5$-pregnene and of the corresponding $\Delta^{1,5}$-pregnadiene. This mixture can be separated by preparative thin-layer chromatography on silicagel in the system toluene+acetone 9:1. The two compounds then reveal the following physical data: The 17,20;20,21bismethylenedioxy derivative of 3,11,20-trioxo-17α,21-dihydroxy-A-nor-B-homo-$\Delta^5$-pregnene: melting point 202.5°–203.5° C. and the 17,20;20,21-bismethylenedioxy derivative of 3,11,20-trioxo-17α,21-dihydroxy-A-nor-B-homo-$\Delta^{1,5}$-pregnadiene: melting point 251°–253° C.

EXAMPLE 8

While cooling with ice and stirring under nitrogen, a solution of 813 mg. of oxalic acid dimethyl ester in 10 ml. of benzene is mixed with 216 mg. of sodium methylate. Fifteen minutes later, 813 mg. of the 17,20;20,21-bismethylenedioxy derivative of 3,11,20-trioxo-17α,21-dihydroxy-A-nor-B-homo-pregnene are added, flushing being carried out with 2 ml. of benzene. After stirring for 4½ hours while slowly warming up to room temperature, 0.3 ml. of glacial acetic acid and toluene are added, the whole is washed with water, dried and evaporated under vacuum. To remove the oxalic acid dimethylester the residue is heated for 45 minutes at 70° C. under 0.08 mm. pressure. Crystallization of the residue from methylenechloride+ether furnishes 695 mg. of the 2-methoxalyl compound melting at 233°–236° C.

While stirring and cooling with an ice+sodium chloride mixture a solution of 572 mg. of the 2-methoxalyl compound obtained above and 3 g. of potassium acetate in 15 ml. of methanol is mixed within 15 minutes with 4.05 ml. of an 0.6N-solution of bromine in carbon tetrachloride. After stirring for 4½ hours at about −15° C., the batch is diluted with water, extracted with methylenechloride, washed with dilute sodium bicarbonate solution and water, dried and evaporated under vacuum. The residue is treated, as described in example 7, with lithium bromide and lithium carbonate in dimethylformamide, whereupon, as in example 7, a mixture of starting material, a small quantity of monoene and the 17,20;20,21-bismethylene-dioxy derivative of 3,11,20-trioxo-17α,21-dihydroxy-A-nor-B-homo-$\Delta^{1,5}$-pregnadiene, melting at 251°–255° C., is obtained.

EXAMPLE 9

A solution heated at 50° C. of 2.66 g. of the 17,20;20,21-bismethylenedioxy derivative of 3,11,20-trioxo-17α,21-dihydroxy-A-nor-B-homo-$\Delta^{1,5}$-pregnadiene in 145 ml. of chlorobenzene is mixed with 160 ml. of carbon tetrachloride, and then 17.6 ml. of solvent are distilled off. The residue is mixed with 1.76 g. of N-bromosuccinimide and 1.12 ml. of pyridine and the mixture is boiled for 20 minutes under nitrogen while being irradiated with a 500 watt lamp. The cooled solution is diluted with methylenechloride, washed with water, dried and evaporated under vacuum at 40° C., and the residue is dissolved in toluene and filtered through 5 g. of alumina (activity II), while flushing with 700 ml. of toluene. The filtrate is evaporated under vacuum at 40° C. and the residue mixed with 210 ml. of dimethylformamide, 15 g. of lithium carbonate and 15 g. of lithium bromide and then stirred for 105 minutes under nitrogen at a bath temperature of 120° C., then poured into water and 20 ml. of glacial acetic acid, extracted with methylenechloride, washed with sodium bicarbonate solution and water, dried and evaporated under vacuum. To remove the residual dimethylformamide, xylene is added and the whole is once more evaporated under vacuum. The fractions eluted with a 19:1 mixture of toluene and glacial acetic acid are evaporated and the residue chromatographed on 133 g. of silicagel and crystallized from methylenechloride+ether, to yield 1.64 g. of the 17,20;20,21-bismethylenedioxy derivative of 3,11,20-trioxo-17α,21-dihydroxy-A-nor-B-homo-$\Delta^{1,5,7}$-pregnatriene which, after recrystallization from the same solvent mixture, melts at 228° to 232° C.

EXAMPLE 10

1.64 grams of the 17,20;20,21-bismethylenedioxy derivative of 3,11,20-trioxo-17α, 21-dihydroxy-A-nor-B-homo-$\Delta^{1,5,7}$ pregnatriene are reacted with 19 ml of a solution of hydrogen fluoride in urea for 20 minutes. The crude 17α,21-diol is acetylated in the 21 position with pyridine and acetic anhydride and the acetate is chromatographed on 82 g. of silicagel containing 15 percent of water. The fractions eluted with a total of 1.5 liters of a 4:1 mixture of toluene and glacial acetic acid are combined and further separated by means of preparative thin-layer chromatography on 10 1-meter silicagel plates in the system toluene: acetone 4:1. The zone which gives a positive reaction with blue tetrazolium is eluted and the residue recrystallized from methylenechloride+ether, to yield 384 mg. of 3,11,20-trioxo-17α-hydroxy-21-acetoxy-A-nor-B-homo-Δ$^{1,5,7}$-pregnatriene melting at 179°–180° C.

Another 160 mg. of the identical compound can be obtained from the mother liquor.

The starting materials used in the preceding examples can be manufactured, for example, as follows:

While cooling with ice, 4.8 g. of lithium aluminum hydride are stirred under nitrogen into a solution of 20 g. of the 17,20;20,21-bismethylenedioxy derivative of 3,6,20-trioxo-11β,17α,21-trihydroxy-A-nor-B-homo-pregnane in 480 ml. of tetrahydrofuran. The whole is stirred for 21 hours at room temperature, then a 1:1-mixture of toluene+ethyl acetate and after it a Seignette salt solution is added. The aqueous phase is repeatedly extracted with toluene, then washed with Seignette salt solution, dried, and evaporated under vacuum. The residue is stirred for 16 hours at 45° to 50° C. under nitrogen with 3 liters of toluene and 600 g. of alumina (activity II), then suctioned off, rinsed with 10 liters of ethyl acetate, and the filtrate is evaporated under vacuum. The residue is chromatographed on 1 kg. of silica gel. From the first fractions, which have been eluted with a 9:1 mixture of toluene and ethyl acetate, there are obtained by crystallization from a mixture of methylenechloride+ether+petroleum ether 400 mg. of the 17,20;20,21-bismethylenedioxy derivative of 6,20-dioxo-11β,17α,21-trihydroxy-A-nor-B-homopregnane. The subsequent fractions contain the 17,20;20,21-bismethylenedioxy derivative of 6,20-dioxo-11β,17α,21-trihydroxy-A-nor-B-homo-Δ$^3$-pregnane of which by crystallization from a mixture of methylenechloride+ether 6.23 g. are obtained; after further recrystallization it melts at 222°–224° C.

Finally, by means of a 4:1-mixture of toluene+ethyl acetate the 17,20;20,21-bismethylenedioxy derivative of 3,20-dioxo-11β,17α,21-trihydroxy-A-nor-B-homo-Δ$^5$-pregnene is eluted in a yield of 7.29 g.; after another recrystallization from a mixture of methylenechloride and ether it melts at 223°–228° C. When in the above reduction the lithium aluminum hydride is replaced by an alcoholic solution of sodium borohydride, and the crude reduction product is boiled with aluminum isopropylate and cyclohexanone in toluene, a mixture of the two unsaturated ketones is likewise obtained; during the catalytic hydrogenation they are transformed into the two saturated ketones described in the following example.

13.63 grams of the 17,20;20,21-bismethylene-dioxy derivative of 3,6,20-trioxo-11β,17α,21-trihydroxy-A-nor-B-homopregnane, 650 ml. of rectified ethanol and 1.62 g. of a palladium carbon catalyst containing 10 percent of Pd are agitated under hydrogen. When 2 mols of hydrogen have been absorbed the catalyst is filtered off, and the filtrate evaporated under vacuum and the residue is recrystallized from a methylenechloride+ether mixture, to yield 8.65 g. of the 17,20;20,21-bismethylenedioxy derivative of 3,20-diox-11β,17α,21-trihydroxy-A-nor-B-homopregnane which, after further recrystallization from the same solvent mixture, melts at 195°–196° C.

By chromatography of the mother liquor on silica gel it is possible to obtain the isomeric 6-oxo-3-desoxo compound melting at 212°–218° C.

In the course of 1 hour 187.5 ml. of 2.66N-perchloric acid are dropped into a solution of 1 g. of the 17,20;20,21-bismethylenedioxy derivative of 3,20-dioxo-11β,17α-trihydroxy-A-nor-B-homo-Δ$^5$-pregnane in 62.5 ml. of tetrahydrofuran while stirring under nitrogen and cooling with ice. The whole is stirred for 17 hours at room temperature, then diluted with saturated sodium chloride solution and four times extracted with methylenechloride. The organic solutions are washed with saturated sodium bicarbonate solution and then with saturated sodium chloride solution and evaporated under vacuum, and the crude 3,20-dioxo-11β,17α,21-trihydroxy-A-nor-B-homo-Δ$^5$-pregnene is then acetylated overnight with 4 ml. of pyridine and 4 ml. of acetic anhydride. The resulting 21-0-acetate melts at 177.5°–179.5° C. after chromatography on 50 g. of silica gel containing 15 percent of water and recrystallization from a mixture of acetone+ether. Yield: 440 mg. From the mother liquor another 290 mg. of the identical compound can be isolated.

While cooling a solution of 1.2 g. of the 17,20; 20,21-bismethylenedioxy derivative of 3,20-dioxo-11β,17α,21-trihydroxy-A-nor-B-homo-Δ$^5$-pregnene in 38 ml. of acetone with ice+methanol, 2 ml. of 8N-chromic acid are added. The whole is stirred for 10 minutes at 0° C. and then worked up in the usual manner, to yield 890 mg. of the 17,20;20,21-bisemethylenedioxy derivative of 3,11,20-trioxo-17α,21-dihydroxy-A-nor-B-homo-Δ$^5$-pregnene melting at 202.5° to 203.5° C.

A solution of 26 g. of the 17,20;20,21-bismethylenedioxy derivative of 3,20-dioxo-11β,17α,21-trihydroxy-A-nor-B-homopregnane in 800 ml. of acetone is mixed, while being stirred and cooled with an ice+methanol mixture, with 50 ml. of 8N-chromic acid. After stirring for 10 minutes at 0° C., the batch is diluted with water and extracted with methylenechloride. The organic solutions are washed with dilute sodium bicarbonate solution and with water, dried and evaporated under vacuum, and the residue is recrystallized from a mixture of methylenechloride+ether+petroleum ether, to yield 21.3 g. of the 17,20;20,21-bismethylenedioxy derivative of 3,11,20-trioxo-17α,21-dihydroxy-A-nor-B-homopregnane which melts at 222° to 226° C. after having been recrystallized once more.

While stirring a mixture of 20 ml. of tetrahydrofuran and 50 mg. of lithium aluminum hydride under nitrogen, there are added to it 190 mg. of the 17,20;20,21-bismethylenedioxy derivative of 3,11,20-trioxo-17α,21-dihydroxy-A-nor-B-homo-Δ$^5$-pregnene. After 2½ hours, while cooling with ice, there are added first 20 ml. of a 1:1 mixture of toluene and ethyl acetate and then 20 ml. of Seignette salt solution. The batch is then extracted with methylenechloride, washed with Seignette salt solution, dried, and evaporated under vacuum at 30° C. A solution of the residue in 11 ml. of benzene is mixed with 0.9 ml. of acetone and 225 mg. of aluminum isopropylate, and the whole is stirred under nitrogen for 15 hours at a bath temperature of 40° C. The product is worked up with methylenechloride and Seignette salt solution. Crystallization from a mixture of methylenechloride, ether and petroleum ether furnishes 120 mg. of the 17,20;20,21-bismethylenedioxy derivative of 3,20-dioxo-11β,17α,21-trihydroxy-A-nor-B-homo-Δ$^5$-pregnene.

This compound is also obtained when the 17,20;20,21-bismethylenedioxy derivative of 3,11,20-trioxo-17α,21dihydroxy-A-nor-B-homo-Δ$^{1,5}$-pregnadiene is reduced as described above and then after oxidized with aluminum isopropylate and acetone in position 3.

We claim:
1. A 3-oxo-A-nor-B-homopregnadiene of the formula

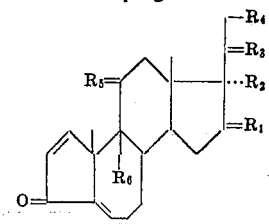

which may contain a double bond in the 7,7a-position, and in which formula R$_1$ represents two hydrogen atoms, methylene or hydrogen together with positioned free hydroxyl or α- or β- positioned methyl, $R_2$ and $R_4$ each represents hydrogen or free hydroxyl esterified hydroxyl derived from a lower alkanoic acid, $R_3$ represents oxo, $R_5$ represents two hydrogen atoms, oxo or hydrogen together with $\beta$-positioned hydroxyl, $R_6$ stands for hydrogen or halogen, or $R_5$ together with $R_6$ represents a double bond or epoxy, each taken with hydrogen at $R_5$.

2. A 3-oxo-A-nor-B-homopregnadiene of the formula

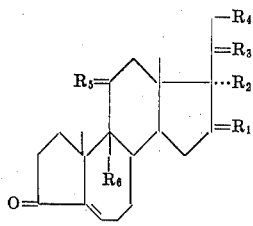

in which $R_1$ represents hydrogen atoms, methylene or hydrogen together with two-positioned free hydroxyl or $\alpha$- or $\beta$-positioned methyl, $R_2$ and $R_4$ represent hydrogen or free hydroxyl or esterified hydroxyl derived from a lower alkanoic acid, $R_3$ stands for oxo, $R_5$ stands for two hydrogen atoms, oxo or hydrogen together with a $\beta$-positioned hydroxyl, $R_6$ for hydrogen atoms or halogen or $R_5$ together with $R_6$ represents a double bond or epoxy, each taken with hydrogen at $R_5$.

3. A 3-oxo-A-nor-B-homo-pregnadiene of the formula shown in claim 2, in which $R_1$ and $R_6$ represent hydrogen and the symbols $R_2$ to $R_5$ have the meanings given.

4. A 3-oxo-A-nor-B-homopregnadiene of the formula shown in claim 2, in which $R_1$ and $R_6$ stand for hydrogen, $R_5$ represents $\beta$-hydroxy together with hydrogen, $R_2$ stands for hydroxy, $R_3$ for oxo and $R_4$ for hydroxy or lower alkanoyloxy.

5. A 3-oxo-A-nor-B-homo-pregnadiene as claimed in claim 4, wherein $R_4$ is acetoxy.

6. A 3-oxo-A-nor-B-homopregnadiene of the formula shown in claim 2, in which $R_1$ and $R_6$ stand for hydrogen, $R_3$ and $R_5$ each represent oxo, $R_2$ stands for hydroxy and $R_4$ for hydroxy or lower alkanoyloxy.

7. A 3-oxo-A-nor-B-homo-pregnadiene as claimed in claim 6, wherein $R_4$ is acetoxy.

8. A 3-oxo-A-nor-B-homo-pregnadiene of the formula shown in claim 2, in which $R_1$ stands for hydrogen, $R_5$ and $R_6$ represent double bond, $R_2$ stands for hydroxy $R_3$ for oxo and $R_4$ for hydroxy or lower alkanoyloxy.

9. A 3-oxo-A-nor-homopregnatriene of the formula

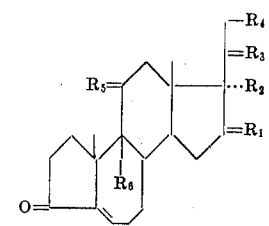

in which $R_1$ represents two hydrogen atoms, methylene or hydrogen together with $\alpha$-positioned free hydroxyl or $\alpha$- or $\beta$-positioned methyl, $R_2$ and $R_4$ represent hydrogen or free hydroxyl or esterified hydroxyl derived from a lower alkanoic acid, $R_3$ stands for oxo, $R_5$ stands for two hydrogen atoms, oxo or hydrogen together with $\beta$-positioned hydroxyl, $R_6$ represents hydrogen or halogen, or $R_5$ together with $R_6$ represents a double bond or epoxy, each taken with hydrogen at $R_5$.

10. A 3-oxo-A-nor-B-homopregnatriene of the formula given in claim 9, in which $R_1$ and $R_6$ stand for hydrogen and the symbols $R_2$–$R_5$ have the meanings given in claim 12.

11. A 3-oxo-A-nor-B-homopregnatriene of the formula shown in claim 9, in which $R_1$ and $R_6$ stand for hydrogen, $R_5$ and $R_3$ each represent oxo, $R_2$ stands for hydroxy and $R_4$ for hydroxy or lower alkanoyloxy group.

12. A 3-oxo-A-nor-B-homopregnatriene as claimed in claim 11, wherein $R_4$ represents acetoxy.

13. A 3-oxo-A-nor-B-homopregnatriene of the formula shown in claim 9, in which $R_1$ and $R_6$ stand for hydrogen, $R_5$ represents $\beta$-hydroxy together with hydrogen, $R_2$ stands for hydroxy, $R_3$ for oxo and $R_4$ for hydroxy or lower alkanoyloxy group.

14. A 3-oxo-A-nor-B-homopregnatriene as claimed in claim 13, wherein $R_4$ represents the acetoxy.

* * * * *

CASE 6169/6170/E

PO-1050
(5/69)

UNITED STATES PATENT OFFICE
CERTIFICATE OF CORRECTION

Patent No. 3,625,997              Dated December 7, 1971

Inventor(s) GEORG ANNER ET AL

It is certified that error appears in the above-identified patent and that said Letters Patent are hereby corrected as shown below:

Column 8, line 75, before "positioned" insert

--- α- ---.

Column 9, line 2, before "esterified" insert

--- or ---;   line 19, after "represents"

insert --- two ---;   line 20, after "with"

delete "two" and insert --- α ---;   line 25, delete "atoms".

Column 10, line 33, delete "group";   line 39, delete

"group";   line 41, delete "the".

Signed and sealed this 4th day of July 1972.

(SEAL)
Attest:

EDWARD M. FLETCHER, JR.
Attesting Officer

ROBERT GOTTSCHALK
Commissioner of Patents